(12) United States Patent
Canney

(10) Patent No.: US 6,581,041 B1
(45) Date of Patent: Jun. 17, 2003

(54) METHOD OF CHARITABLE GIVING/INVESTING

(75) Inventor: Michael L. Canney, Des Moines, IA (US)

(73) Assignee: G, LLC, Des Moines, IA (US)

(*) Notice: Subject to any disclaimer, the term of this patent is extended or adjusted under 35 U.S.C. 154(b) by 0 days.

(21) Appl. No.: 09/325,971

(22) Filed: Jun. 4, 1999

(51) Int. Cl.⁷ ............................................. G06F 17/60
(52) U.S. Cl. ............................. 705/35; 705/36; 705/37
(58) Field of Search ............................ 705/35, 36, 37

(56) References Cited

U.S. PATENT DOCUMENTS

| | | | |
|---|---|---|---|
| 5,466,919 A | | 11/1995 | Hovakimian |
| 5,537,314 A | * | 7/1996 | Kanter .......................... 364/406 |
| 5,621,640 A | | 4/1997 | Burke |
| 6,052,674 A | * | 4/2000 | Zervides et al. ............... 705/40 |
| 6,067,527 A | * | 5/2000 | Lovell et al. .................. 705/21 |
| 6,088,682 A | | 7/2000 | Burke |
| 6,112,191 A | | 8/2000 | Burke |

FOREIGN PATENT DOCUMENTS

| | | | | |
|---|---|---|---|---|
| EP | 0844577 A2 | * | 11/1997 | ............ G06F/17/60 |
| WO | WO 99/49385 | | 9/1999 | |

OTHER PUBLICATIONS

"Raymond James Unveils Charitable Program"; Financial Planning, v29, n6, p28, Jun., 1999.*
"Program Description and Disclosure Memorandum" on American Gift Fund, © 1998.*
Kane "Plastic cards carry plenty of options", Calgary Herald, p D8, Oct. 8, 1995.*
A Wall Street Pioneer Is Still Making Her Mark, Wall Street Journal, May 27, 1997.*
CFC 2001 Catalog of Caring, p. 1.*

* cited by examiner

Primary Examiner—Vincent Millin
Assistant Examiner—Jagdish N Patel
(74) Attorney, Agent, or Firm—McKee, Voorhees & Sease, P.L.C.

(57) ABSTRACT

In an effort to increase charitable giving, a method of systematically linking investing with giving by designing a fee structure within an investment whereby a part of the fee is automatically transferred to a donor-advised account within a charitable community foundation. A charitable liaison will usually introduce a donor to this process of charitable giving/investing. In addition, the donor will often have an investment advisor. Both the charitable liaison and the investment advisor will receive a part of the fee associated with the investment. If the form of investment is a mutual fund, then the fund manager will also be compensated from a part of the fee. In an alternative method, a credit card or debit card may also be utilized to systematically link charitable giving with consumer purchases. In the credit/debit card context, a part of the fee equal to the difference between what a consumer charges and what the card issuer pays to the merchant is given to a charitable community foundation and directed to a donor-advised account within such foundation.

14 Claims, 3 Drawing Sheets

METHOD OF CHARITABLE GIVING/INVESTING

BACKGROUND OF THE INVENTION

A. Field of the Invention

The present invention relates to a method of charitable giving. More specifically, the present invention relates to linking charitable giving with investing and consumer purchasing.

B. Problems in the Art

Throughout the world, there are people who are underprivileged and lack some of the basic necessities of life. For various reasons, these people do not have the financial means to provide for some of life's basic requirements. A variety of programs exist to help these people, but they all fall short in one respect or another.

One of the major providers for the needy has been the government, both at the state and federal level. State governments have provided programs such as unemployment compensation. The federal government has provided programs such as welfare, food stamps, and subsidized housing. However, due to bureaucratic inefficiency, many of these programs produce a great deal of waste. In addition, many people resent government-directed social services programs.

In addition to the various government programs, a number of charitable groups exist to help the poor. The United Way, the Salvation Army, and church related groups are examples of such charities. In many instances, these groups do an excellent job of helping those in need. Sadly, these charities often suffer from a lack of funding, so they cannot help all those who need it.

Due to the shortcomings of government programs and the paucity of funds currently given to charities, there is need for a method which will increase the funding for charities. The present invention helps meet this need by linking charitable giving with investing and consumer purchasing.

Currently, there are many charities and many different investment vehicles. Popular gifting methods include "split gifts" where the distribution to charity is deferred until the death of the donor. In many cases, years pass before the charity actually receives any money. There is a need in the art for an investment/purchasing process whereby money is automatically given to a charity on a regular and timely basis.

Therefore, a primary objective of the present invention is to provide a method of charitable investing/purchasing that will help address problems and deficiencies in the art.

Another objective of the present invention is to provide a method of charitable investing/purchasing that will increase the amount of funds that are donated to charitable groups.

A further objective of the present invention is to provide a method of charitable investing/purchasing that will decrease the need for governmental assistance programs.

A still further objective of the present invention is to provide a method of charitable investing/purchasing that spawns new charitable financial instruments.

Another objective of the invention is to provide a method of charitable investing/purchasing that is easy to implement and efficient in operation.

These and other objects, features, and advantages of the present invention will be apparent from the following specification and claims, in conjunction with the accompanying drawings.

SUMMARY OF THE INVENTION

A method of charitable investing/purchasing involves the use of a financial instrument or a financial account or service that normally has an embedded fee structure. For example, one such financial instrument is a mutual fund which typically charges an annual fee to investors for investment management and administration. Other examples would include unit trusts, life insurance policies, annuities, brokerage accounts, and trust accounts, among others. From the fees normally deducted from the value of (or earnings on) the investment instrument, account or service, a portion would be redirected to a charitable community foundation account (a "donor advised account") over which the donor has the right to provide nonbinding instructions with respect to charitable distributions to be made from the account. Further steps include introducing a donor to the community foundation and this charitable giving process, and advising the donor on the financial and philanthropic benefits of this process. The investment advisor and the person who introduced the donor to this charitable giving/investing process (the "charitable liaison") would receive compensation from specified parts of the standard fee.

A second embodiment involves a purchasing account, such as a credit card or debit card account. The difference between what the consumer pays for purchases and what the credit/debit card company pays the merchant represents a fee paid to the card issuer. Part of the fee from this specially structured credit/debit card would be given to a charitable community foundation donor advised account. Other parts of the fee would be used to compensate the consumer's investment advisor, if any, and to compensate the charitable liaison.

Rather than a credit/debit card, the account could be a brokerage account, or any other account or financial service to which a fee is applied. Part of the fee is given to charity. Other parts of the fee can be used to compensate the donor's investment advisor and the charitable liaison.

DETAILED DESCRIPTION OF THE PREFERRED EMBODIMENT

Figure 1:
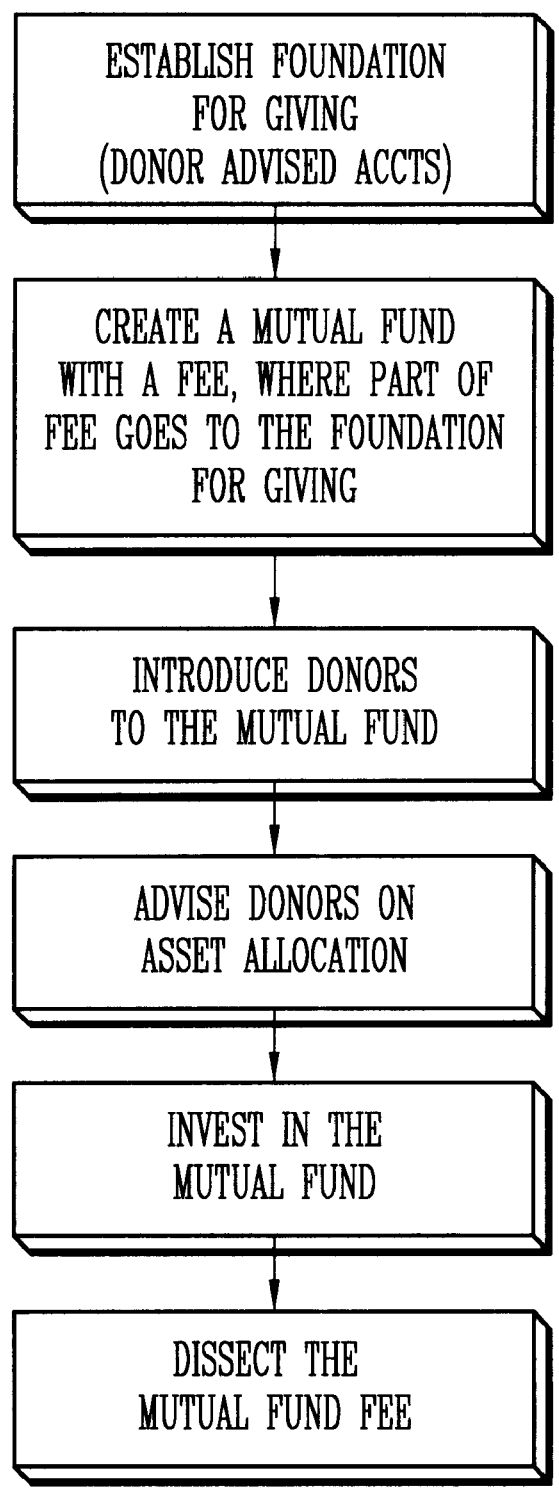
FIG. 1 is a flowchart of a preferred method of charitable investing/purchasing according to the present invention.

A preferred method of charitable investing/purchasing is schematically shown in FIG. 1. The preferred method consists of six steps.

The first step in the process is the establishment of a charitable community foundation, known as the "Foundation for Giving." Within the Foundation for Giving, donor advised accounts are established. These donor advised accounts are the recipients of donated funds. The Foundation for Giving controls how the donated funds are disbursed from the donor advised accounts. The Foundation for Giving is a tax exempt charitable organization, as defined in the Internal Revenue Code.

Figure 2:
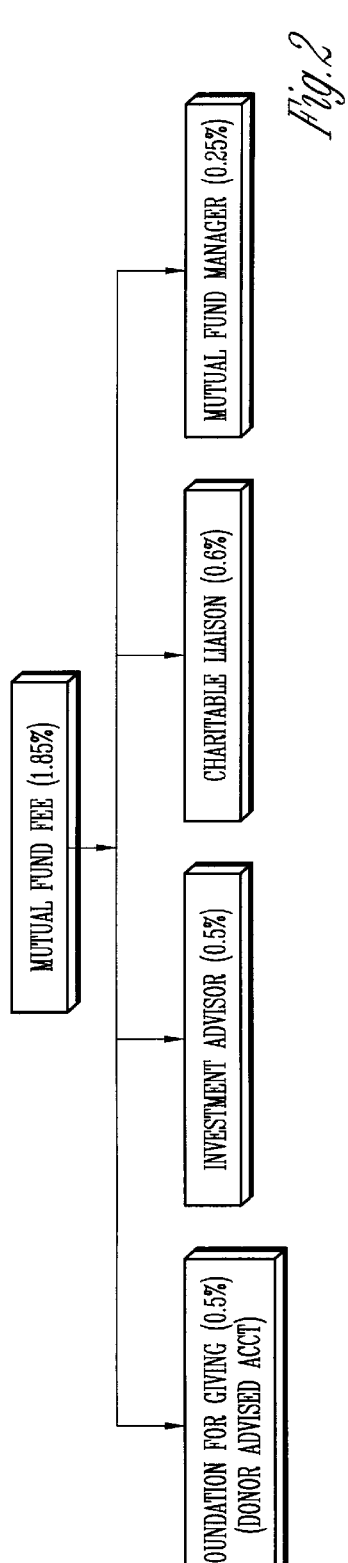
FIG. 2 is a block diagram of the fee structure that is utilized with the preferred method (mutual fund).

The second step in the preferred method is the creation of a fee structure to be applied to a financial instrument or account wherein part of the fee is sent to the investor's donor advised account within the Foundation for Giving. The fee shall be expressed as an annual percentage (for example, 1.85%) of the value of the underlying instrument or account. For example, where a mutual fund is the underlying instrument, the annual fee will equal the product of the percentage (1.85%) multiplied by the value of the mutual fund at the time the fee is assessed. The dissection of this fee is shown in FIG. 2. The mutual fund with this type of fee structure is referred to as a "charitable giving mutual fund." The various recipients of the fee dissection in FIG. 2 will be discussed later. Preferably, the fee is no greater than the fee usually charged for similar investments.

After the mutual fund has been established, potential donors are introduced to the idea of making charitable gifts through mutual fund investing. The individual or entity that introduces potential donors to the idea of giving through this charitable mutual fund is referred to as a charitable liaison. There are many different ways that donors can be introduced to this charitable giving/investing process. In some instances, the charitable liaison would be an individual or an organization that promotes planned giving to its constituent base. The individual or organization would not be involved in giving investment advice.

Oftentimes, the charitable liaison will be a charity or an individual affiliated with a charity. In this scenario, the charitable liaison would not give the donor investment advice, but merely educate the donor on the merits of this charitable giving/investing process. Alternatively, the donor's investment advisor could serve as a charitable liaison. In this context, the investment advisor educates the donor on the societal importance of charitable giving and also gives the donor advice on asset allocation. Regardless of who serves as a charitable liaison, that person would receive compensation for the donors introduced by him/her who elect to participate in this charitable giving/investing process.

The fourth step of the preferred method consists of advising potential donors on asset allocation. This role is usually played by the donor's professional investment advisor. The investment advisor helps the donor decide where to allocate the donor's money amongst stocks, bonds, and various other financial investments.

The fifth step in the preferred method consists of the donor investing in the charitable giving mutual fund or other financial instrument utilizing this charitable giving/investing process. After the donor makes an investment, the percentage fee (1.85%) is charged to the investment on a systematic basis.

The final step in the preferred embodiment consists of dissecting the percentage fee (1.85%) among various individuals and entities. For example, the donor's advised account with the Foundation for Giving receives 0.5%; the charitable liaison receives 0.6%; the donor's investment advisor receives 0.5%; and the entity which manages the mutual fund or other investment advisor receives 0.25%.

In order to compensate the charitable liaison, it is necessary to know who introduced the donor to the idea of investing in the charitable giving mutual fund. Therefore, the donor's investment advisor or the mutual fund company will keep records regarding the identity of the charitable liaisons. These records will help ensure that the charitable liaisons are compensated for their efforts out of the fees.

A second entity, called "The Giving Group," has also been formed. The Giving Group will educate people on the merits of this charitable giving/investing process and will encourage participation in this process. The Giving Group will coordinate the activities of the independent charitable liaisons and will itself be a charitable liaison.

The fee dissection (FIG. 2) will vary depending on how and by whom the various functions are performed. For example, a charitable organization, such as a church, might want to inform its constituent base about this charitable giving/investing process. In this case, the charitable organization itself would receive the 0.6% charitable liaison portion of the fee.

In other cases, the charitable organization might not have the ability to provide information to its constituent base about this charitable giving/investment process. In that situation, the charitable organization could utilize the resources of The Giving Group to provide this information. In this case, the charitable organization and The Giving Group would divide the 0.6% charitable liaison fee.

A third possibility as a charitable liaison is the donor's investment advisor. In this case, the investment advisor gives advice as to asset allocation and also introduces the donor to this charitable giving/investing process. Here, the investment advisor receives both the advisor part of the fee and the charitable liaison portion.

Figure 4:
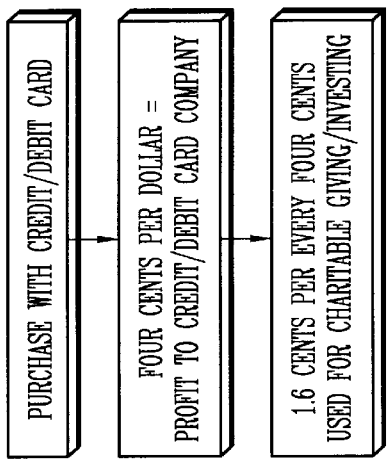
FIG. 4 is a flowchart of a second method of charitable investing/purchasing according to the present invention.

A second method of charitable giving/investing is shown in FIG. 4. This embodiment involves the use of a credit card, debit card, or other similar payment device. In the typical arrangement, when a consumer makes a purchase with a credit/debit card, the credit/debit card company does not pay the vendor $1 for every $1 charged by the credit/debit card user. Usually, the credit/debit card company pays the vendor 96¢ for every $1 charged. The 4¢ difference represents a fee charged by the credit/debit card company.

The credit/debit card company usually devotes a part of the fee to promotional giveaways such as airplane tickets or magazine subscriptions. These promotions are designed to attract new customers and retain existing ones. Usually, about 1.6¢ out of the 4¢ is spent on these promotional giveaways.

Figure 5:
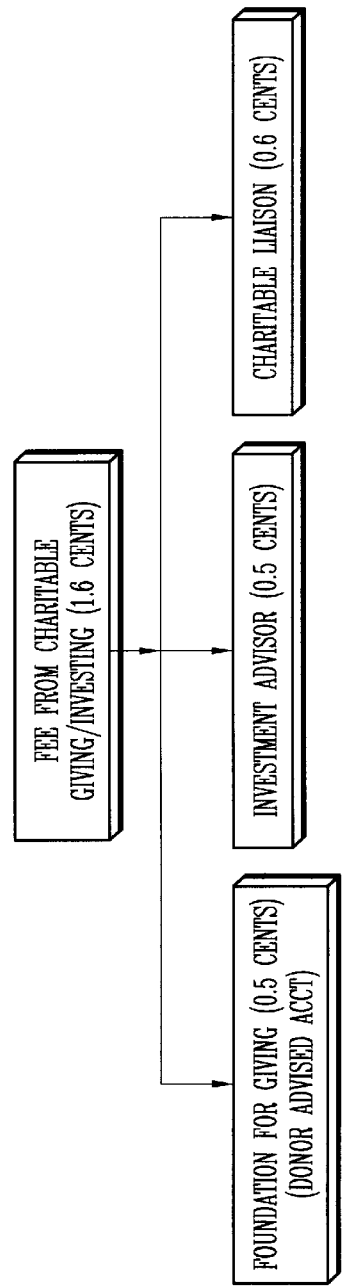
FIG. 5 is a block diagram of the fee structure that is used with the second method.

In the second method of this charitable giving/investing, the portion of the fee (for example, 1.6¢) is not used for promotional giveaways. Instead, as shown in FIG. 5, the money is used for this charitable giving/investing. For example, 0.5¢ out of every dollar that is charged by the consumer is put into the consumer's donor advised account within the Foundation for Giving; 0.6¢ is also paid to the charitable liaison who introduced the donor to this charitable giving/investing; and 0.5¢ is paid to the donor's investment advisor. Preferably, the portion of the fee that is used for this charitable giving/investing process is no less than the amount normally spent on promotions, such that the net profit to the credit/debit card issuer neither increases nor decreases.

In addition to mutual funds and credit/debit cards, the method of this charitable giving/investing can be used with other types of investments and different types of accounts. For example, a brokerage account that charges a fee to the account could dissect the fee so that part of it is given to a donor advised account. Other parts of the fee would be used to compensate the donor's broker, the donor's investment advisor, and the charitable liaison. The brokerage account may be managed by someone other than the donor. In that context, part of the fee would also be used to compensate the account money manager. If the donor manages his own account, the management portion of the fee would be eliminated.

The method of this charitable giving/investing could also be used with a brokerage account that charges a commission rather than a fee. Instead of dissecting a fee, the commission is dissected. Parts of the commission would be used to compensate various individuals in the same manner discussed in the preceding paragraph.

The method of this charitable giving/investing can also be applied to trusts or IRAs. Any account that charges a fee could dissect the fee so that part of it is automatically given to a donor advised account within a community foundation. The type of account is not a limiting factor. The key point is that part of the fee is guaranteed to be given to the donor advised community foundation account in a systematic manner.

Figure 3:
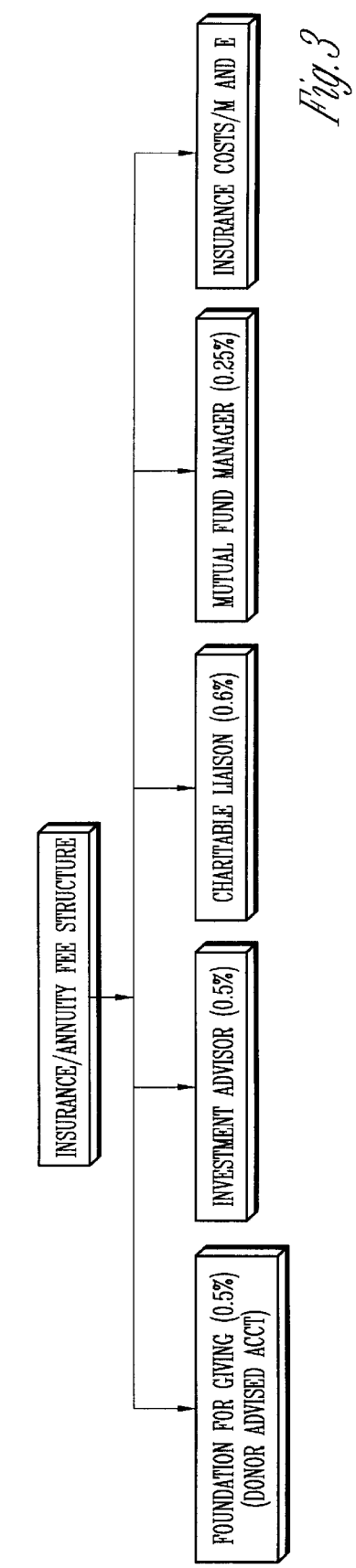
FIG. 3 is another block diagram of the fee structure utilized with the preferred method (insurance/annuity product).

The method of this charitable giving/investing can also be applied to investments such as life insurance and annuities. (FIG. 3). In this context, part of the fees usually deducted from the earnings on the cash value build up of the life insurance policy or the amount invested in an annuity policy would be sent to the policyholder's donor advised community foundation account. In the box labeled "insurance costs/M and E" in FIG. 3, "M and E" is an abbreviation for mortality and expense charge.

Much of the method of charitable giving/investing will be implemented through the Internet. For example, profiling of donors can be done over the Internet. A potential donor is asked a series of questions to enable the investment advisor to give advice based on the responses. The donor can also be introduced to this charitable giving/investing over the Internet. The donor can also use the Internet to invest in the charitable giving mutual fund or other charitable giving investments. The donor can access both his/her charitable giving investment accounts and his/her donor advised account with the Foundation for Giving account to see the performance of these accounts.

It is believed that the donor will be able to take a tax deduction for the part of the fee that is given to the Foundation for Giving, and also for the part of the fee that is paid to the charitable liaison, when the charitable liaison is a charity. With the present invention, an investor would be helping charity and saving on taxes.

In the drawings and specification there has been set forth preferred and alternative methods according to the invention, and although specific terms are employed, these are used in a generic and descriptive sense only and not for purposes of limitation. Changes in one or more steps are contemplated without departing from the spirit or scope of the invention as further defined in the following claims.

I claim:

1. An Internet-based method of philanthropic and giving that provides a donor with control over investment direction of at least a portion of a fee, comprising:

conducting a transaction using financial instrument, account or service over the Internet with an embedded fee structure, for generating the fee wherein the donor provides a payment;

selecting a charitable organization, wherein selecting is performed by the donor over the Internet;

giving at least a portion of the fee to a donor-advised account wherein the donor directs investment; and benefiting the charitable organization with proceeds of the donor-advised account.

2. The method of claim 1 wherein the step of conducting a transaction includes conducting a transaction using a credit card bank card, or debit card.

3. The method of philanthropic investing and giving according to claim 1, wherein the charitable organization is a community foundation.

4. The method of philanthropic investing and giving according to claim 1, further comprising:

introducing a donor to the philanthropic investing process.

5. The method of philanthropic investing and giving according to claim 4, further comprising:

compensating whoever introduced the donor to the process with a second part of the fee.

6. The method of philanthropic investing and giving according to claim 4, further comprising:

advising the donor on the methods and benefits of linking philanthropy with investing.

7. The method of philanthropic investing and giving according to claim 6, further comprising:

compensating the donor's advisor with a third part of the fee.

8. The method of philanthropic investing and giving according to claim 1, wherein a financial instrument is a mutual fund that is managed by a mutual fund manager.

9. The method of philanthropic investing and giving according to claim 8, further comprising:

compensating the mutual fund manager with a fourth part of the fee.

10. The method of philanthropic investing and giving according to claim 1 wherein the financial instrument is an annuity.

11. The method of philanthropic investing and giving according to claim 1 wherein the financial instrument is life insurance.

12. The method of philanthropic investing and giving according to claim 1 wherein the financial instrument is a unit trust.

13. The method of philanthropic investing and giving according to claim 1 wherein the financial instrument is a brokerage account.

14. The method of philanthropic investing and giving according to claim 1 wherein the financial instrument is a trust account.

* * * * *